United States Patent

[11] 3,612,686

| [72] | Inventors | Robert S. Braman<br>Tampa, Fla.;<br>Alexander Dynako, Chicago, Ill. |
|---|---|---|
| [21] | Appl. No. | 695,455 |
| [22] | Filed | Jan. 3, 1968 |
| [45] | Patented | Oct. 12, 1971 |
| [73] | Assignee | IIT Research Institute<br>Chicago, Ill. |

[54] METHOD AND APPARATUS FOR GAS ANALYSIS UTILIZING A DIRECT CURRENT DISCHARGE
15 Claims, 4 Drawing Figs.

[52] U.S. Cl. .................................................. 356/86,
313/231, 315/111
[51] Int. Cl. ........................................................ G01j 3/30
[50] Field of Search ............................................ 315/111;
356/85, 86; 313/231, 94.5

[56] References Cited
UNITED STATES PATENTS

| 2,643,574 | 6/1953 | Todd | 356/86 |
| 3,334,314 | 8/1967 | White | 331/94.5 |
| 3,394,320 | 7/1968 | Medicus | 331/94.5 |
| 3,464,028 | 8/1969 | Moeller | 331/94.5 |
| 3,469,207 | 9/1969 | Solomon et al. | 331/94.5 |

FOREIGN PATENTS

| 927,138 | 5/1963 | Great Britain | 356/86 |

OTHER REFERENCES
Frederickson et al.: Analytical Chemistry, vol. 23, No. 5 May 1951 pp. 742–744.

Owen: Developments in Applied Spectroscopy vol. 1, edited by W. D. Ashby, Plenum Press, New York 1962 pp. 143–154.

Alexandrov et al.: Optics and Spectroscopy, vol. 23, No. 4, Oct. 1967, pp. 282–286.

Raziunas et al.: Applied Spectroscopy, vol. 20 No. 6 Nov./Dec. 1966, pp. 395–399.

Freiberg et al.: Journal of Applied Physics, vol. 38, no. 1, Jan., 1967, pp. 250–262.

McElroy et al.: Aperture Coupling of a Carbon Dioxide Laser Employing a Near-Confocal Optical Resonator, Goddard Space Flight Center, Greenbelt, Maryland Oct. 1967 pp. 1–8.

*Primary Examiner*—Ronald L. Wibert
*Assistant Examiner*—F. L. Evans
*Attorney*—Fitch, Even, Tabin & Luedeka ABSTRACT: A method and apparatus for spectrochemical analysis of a gas is provided in which the subject gas is mixed with a carrier gas and introduced into an analysis space between two electrodes. A continuous direct current discharge between the electrodes is produced which sustains a plasma formed from the carrier gas so that components of the subject gas are excited to luminescence. Characteristic radiation emitted by the components is then detected. The carrier gas has a higher ionization potential than components of the subject gas and, for example, may be a noble gas. The method is operable at atmospheric pressure. The electrodes may be either solid wires or tubes through which the gas mixture enters and leaves the analysis space.

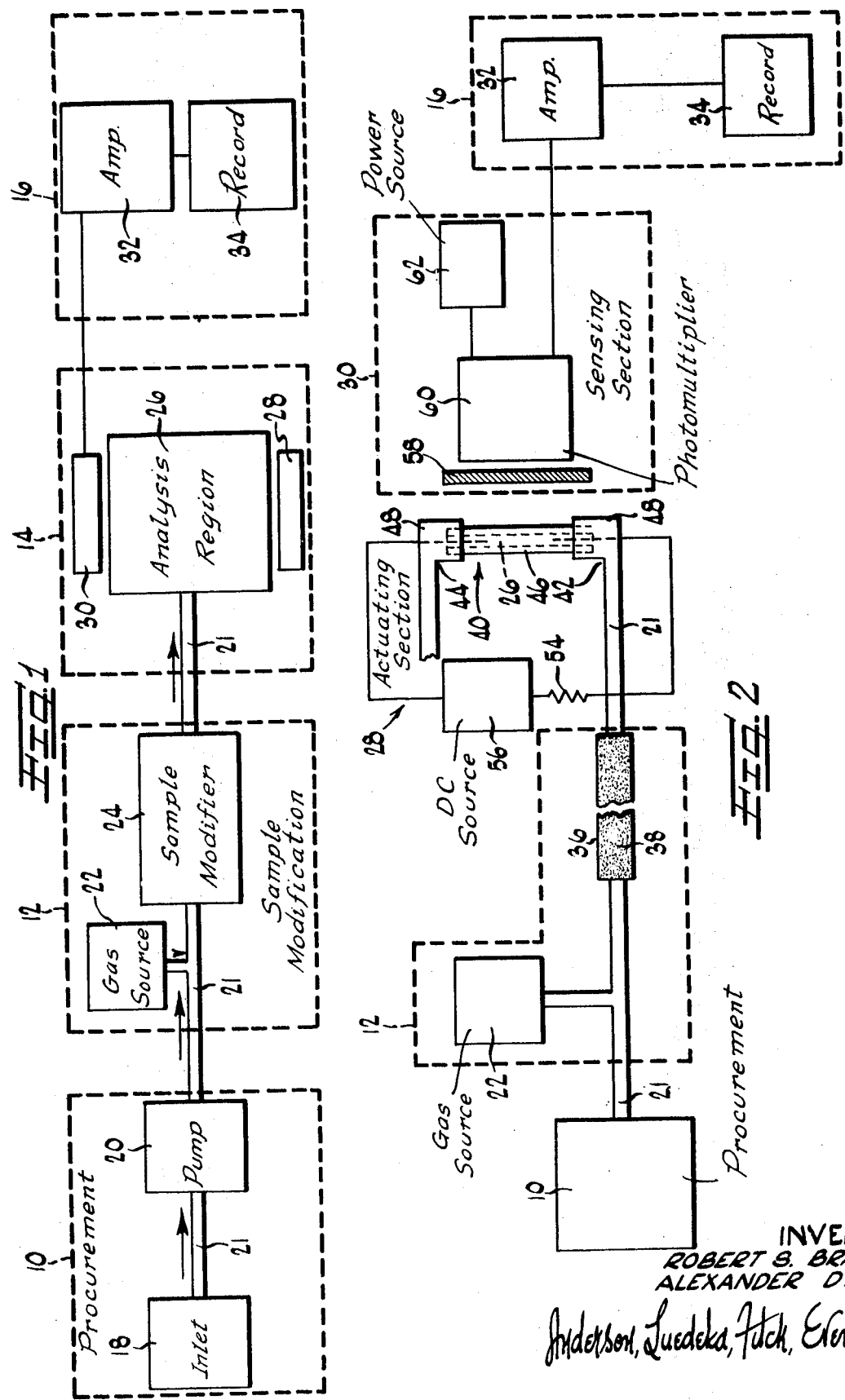

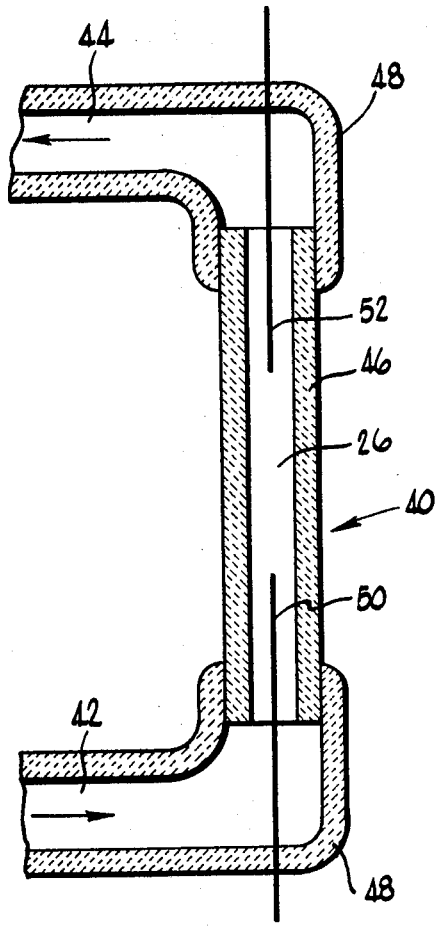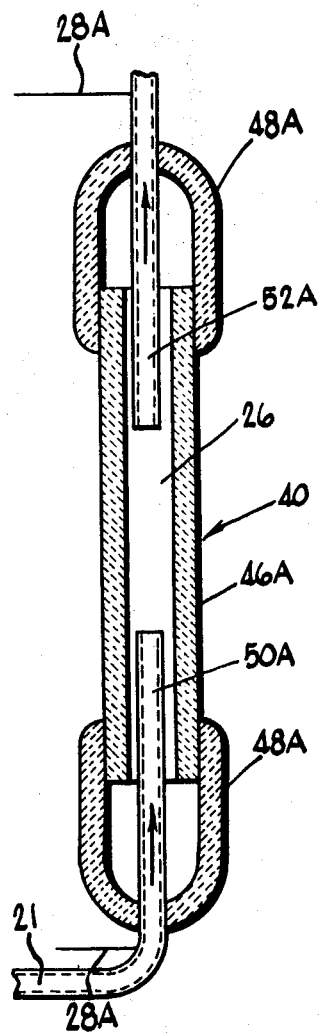

METHOD AND APPARATUS FOR GAS ANALYSIS UTILIZING A DIRECT CURRENT DISCHARGE

This invention relates to gas analysis. More particularly the invention relates to an improved method and apparatus for analyzing gases utilizing the spectra emitted by components of a gas which are excited to luminescence by a direct current high-voltage discharge through the gas.

The analysis of gases finds many important applications, including scientific research, the control of industrial processes, the detection of air pollutants, and the detection of underground objects which produce gases. Clearly in many of these uses of gas analysis compact portable equipment is desirable. In virtually all such applications of gas analysis it is also desirable to be able to detect small amounts and proportions of the components of the gas.

Often gas analysis by physical or chemical means is combined with the process of gas chromatography. Gas chromatography is a procedure in which a mixture of gases including a carrier gas is passed through a column which selectively retards the passage of components of the mixture, thus causing the different components to emerge from the column at different times. The identity and the relative proportions of the components of the column effluent may then be determined by analyzing the effluent gas at different times.

A common way to analyze the effluent of a gas chromatographic column is measurement of the thermal conductivity of the effluent gas. This method is relatively insensitive to small amounts of gas and hence requires a large sample for analysis. Methods which are more sensitive include measurement of the ionization of the effluent in a flame to detect carbon-containing compounds and measurement of electron capture characteristics of the effluent gas to detect halogenated compounds and conjugated esters. The usefulness of these latter methods is generally limited to the detection of the compounds mentioned when they are present in the column effluent. Hence, a method of gas analysis applicable to a wide range of compounds which has greater sensitivity than thermal conductivity measurements is desirable for use with gas chromatography.

Recently, research has been directed at developing improved spectrochemical methods and apparatus for gas analysis. Spectrochemical analysis generally relates to the identification and determination of the quantity of components of a substance from the spectrum of the substance. One form of spectrochemical analysis utilizes the phenomenon that an incandescent vapor or gas emits distinctive electromagnetic radiation. In emission-type spectrochemical analysis a sample is vaporized if it is not already in gaseous form, and excited to luminescence to produce electromagnetic radiation. The component frequencies of the radiation produced are characteristic of the components of the subject gas. The radiation is resolved into a spectrum and the characteristic wavelengths and wavebands observed. The intensity of the various characteristic lines and bands is indicative of the amount of the respective associated components present in the sample.

Various methods have been used to excite a sample to luminescence, in all of which, of course, energy is added to the sample. One method of exciting a sample is to place it in a flame such as the flame of a bunsen burner or of an oxyacetylene burner. Another way to excite a sample which also utilizes thermal energy is to place the sample inside a carbon tube in an evacuated electric furnace, the tube and sample being heated by high currents through the tube. A third excitation method using thermal energy is a direct current spark between two electrodes which heats and vaporizes a sample located on the cathode. Among electronic excitation methods are the use of a high-voltage alternating current spark across an airgap to ionize and excite atoms in the gap. In "hollow cathode" devices a steady state plasma produce by a continuous discharge in a low-pressure gas tube is used to produce luminescence. Microwave generators or Tesla coils may also be used to produce a plasma and to provide energy to a sample mixed with the plasma to cause luminescence.

All of these methods of sample excitation have presented difficulties. Some of the methods are not suitable for gas analysis. The direct current spark, for example, requires a solid sample which is vaporized as well as excited by the spark. In other methods, such as those utilizing Tesla coils or microwave generators, relatively large and cumbersome equipment and power sources are required. In still other methods such as the hollow cathode devices an extremely low-gas pressure is required which necessitates the use of additional large equipment militating against portability of the device. Improvement of the sensitivity of the detector to components present in small amounts over the sensitivity of virtually all the devices discussed is also desirable.

It is an important feature of the present invention to excite a subject gas or vapor to luminescence by passing a direct current discharge through a mixture of the subject gas and a carrier gas to sustain a plasma formed from the carrier gas. The method and the apparatus for performing the method have the distinct advantages of being operable at atmospheric pressure, utilizing compact lightweight equipment and resulting in sensitive measurements of small amounts of gases.

Accordingly, it is an components object of the present invention to provide an improved method and apparatus for gas analysis with which to detect small proportions of components of a subject gas.

Another object of the invention is to provide an improved gas analysis apparatus which is compact, lightweight, and portable.

Yet another object of the invention is to provide a method and apparatus for gas analysis which is operable at atmospheric pressure and with relatively small power requirements.

A further object of the invention is to provide a gas analysis method and an apparatus which are suitable for continuous analysis of the components of the effluent gas of a gas chromatographic column.

Yet another object of the invention is to provide a gas analysis method and apparatus utilizing a continuous direct current discharge between two electrodes to produce a plasma.

Other objects and advantages of the invention will become apparent from the following description and from the accompanying drawings, in which:

FIG. 1 is a schematic representation of a generalized gas analysis system;

FIG. 2 is a diagrammatic view of a portion of a gas analysis system utilizing the present invention;

FIG. 3 is an enlarged view of a portion of the sample analysis section of the system shown in FIG. 2; and FIG. 4 is an enlarged view of another embodiment of a portion of the sample analysis section of the system.

As illustrated in FIG. 1 a generalized gas analysis system includes a sample acquisition or sample procurement section 10, a sample modification section 12 which prepares the sample for analysis, a sample analysis section 14 for producing and detecting a response from the sample and a data readout section 16.

A typical sample procurement section 10 includes an inlet 18 through which a sample of the subject gas enters the system and a pump 20 which moves the sample through the system via appropriate tubing 21. The procurement section may have undesired effects on the sample composition such as by adding impurities or by absorbing or allowing to escape certain components of the initial sample. Such effects, however, may ordinarily be prevented or compensated for by suitable conventional means.

From the sample procurement section, the subject gas is ordinarily passed to a sample modification section 12 which prepares the sample for analysis. This section may include a gas source 22 which provides a carrier gas with which the sample of subject gas is mixed. A carrier gas may be useful to dilute the sample or to provide other characteristics for the gas mixture useful in the particular method of gas analysis employed. As described in greater detail below a carrier gas is used which is ionized to form a plasma and gases with high-ionization potentials are highly desirable for this purpose. The sample modification section may also include a sample modifier 24 which modifies the sample in a desired manner. The sample modifier may be a gas chromatographic column which distributes components of the sample over a period of time at its exit, as previously mentioned, or a reaction chamber which produces modified gas components by chemical or even nuclear reactions.

The modified sample then passes to the sample analysis section 14. The sample analysis section includes an analysis region or space 26 in which the sample is present during the analysis, an activating means 28 which operates to produce a detectable response from the sample and a sensing means 30 which operates to detect that response. The analysis region may include a volume of space as to which the activating means does not produce a response or the sensing means does not detect that response. Such a volume is referred to as the "inactive volume." This term is to be contrasted with the term "active volume" or "effective active volume" as to which a response is both produced and detected. The amount of active volume in the gas analysis space 26 is an important factor in gas analysis, especially in quantitative analysis.

The sensing means 30 detects the response of the sample of the subject gas and produces an electrical output related to the sample response detected which is transmitted into the data readout section 16. The data readout section includes a suitable amplifier 32 and a recorder 34 on which current or voltage may be recorded as a function of time.

A portion of a gas analysis system showing various features of the present invention is illustrated in greater detail in FIG. 2. As shown, the sample acquisition section 10 provides a sample of the subject gas to the sample modification section 12. The tubing 21 through which the sample is channeled is connected to a carrier gas source 22 which mixes a carrier gas with the sample. For reasons which will shortly become apparent it is desirable that the carrier gas, which may itself be a mixture of gases, comprise a gas having a relatively high-ionization potential as compared with the components of the subject gas to be detected. Examples of such gases are the noble gases: helium, neon, argon, krypton, xenon, and radon. The gas mixture thus produced is fed into a gas chromatographic column 36 which functions as the sample modifier. In one embodiment the column is a 4-foot-long tube with a ¼-inch outer diameter. The tube is filled with packing 38 of silicone gum rubber on the material sold under the name Chromasorb W by Johns-Manville Corp. which selectively retards various components of the subject gas. The rate of carrier gas flow through such a column is in the range from about 30 milliliters per minute to about 60 milliliters per minute although other columns of other packing materials and with different flow rates could, of course, be used. Several such materials are described in "Gas-Liquid Chromatography" by Stephen Dal Nogare and Richard S. Juvet (1962 Interscience) at pp. 141-144. The sample analysis section now to be described is operable in a range of gas flow from zero milliliters per minute to about 300 milliliters per minute, however.

From the sample modification section 12 the gas mixture flows through appropriate tubing 21 to the sample analysis section 14. The sample analysis section, as illustrated in FIG. 2, includes an analysis chamber 40, an activating means 28 and a sensing means 30. Specifically, the analysis chamber 40, which is also shown in detail in FIG. 3, has an inlet 42 and an outlet 44 at opposite ends for the flow of the gas mixture through the chamber. As illustrated, the analysis chamber 40 includes a central portion 46 of capillary tubing adjacent to the sensing means 30. The tubing has an inner diameter of between 1 millimeter and 10 millimeters but preferably of about 1 to 2 millimeters. The chamber is closed at each of the central portion by chamber cap 48 which has a gastight fit with the outer diameter of the tubing 46 to prevent the entry of air. One of the chamber caps 48 is connnected with the tubing 21 from the gas chromatographic column 36 while the other cap 48 is vented to the air or may be connected to a gas disposal system (not shown). The central portion 46 of the chamber is formed of an electrically insulating material through which can pass the frequencies of radiation expected to be radiated by the subject gas in the gas analysis chamber 40 so that such frequencies can be sensed by the sensing means 30 positioned outside of the chamber adjacent to the central portion. Pyrex brand glass has been found suitable in many cases but for high-power operations translucent quartz tubing is preferable since it is more resistant to heat. The chamber caps 48 may be formed of similar electrically insulating material.

Activation of the subject gas in the chamber 40 is accomplished by passing a continuous direct current discharge through the gas analysis chamber. The term "continuous direct current discharge" is used herein to refer to the passage of a more or less continuous unidirectional current through a gas in accordance with conventional usage of the term "discharge" to refer to the passage of any electric current through a gas regardless of its duration. From the etymological standpoint the term "discharge" would not appear to be applicable to a continuous current but the usage arose because early experiments relating to currents in gases were carried on using self-limiting discharges from such devices as a Leyden jar and the usage was extended and still exists with respect to continuous currents. The discharge utilized to activate the subject gas with the apparatus described herein is of such a magnitude as to ionize the carrier gas to produce and thereafter sustain a plasma formed from the carrier gas. An important feature is that the carrier gas is selected to have a high-ionization potential, preferably higher than that of any of the components of the subject gas to be detected. Such a selection of the carrier gas and the power applied results in a high-energy plasma and ensures that the components of the subject gas will be excited to luminescence and that more of the characteristic frequencies of the components will be produced. At lower energies only some of the frequencies will be produced. While the exact mode of operation of the device is not completely understood it is believed that the components of the gas are excited by the free electrons in the discharge and also by transfer of energy from the ions of the carrier gas plasma. This explanation, of course, should not be taken as a limitation of the invention.

In practice it has been found that helium, which has the highest ionization potential of any known element, provides a higher energy plasma, permits a much more even discharge, and is useful at higher gas pressures, and especially including atmospheric pressure. Other noble gases, particularly argon, have also been found suitable as a carrier gas, since these elements too have relatively high-ionization potentials. With gases other than helium, however, reduced pressure in the chamber 40 is sometimes desirable since power requirements generally increase with chamber pressure. Also, the problems associated with heating of the chamber are greater with other gases since helium is a more effective coolant. The gases, of course, may be mixed to form the carrier gas. Contamination by air is avoided, however, since the discharge is extinguished by its presence in excessive quantities.

As illustrated in FIGS. 2 and 3 the discharge through the carrier gas is produced by means of two electrodes 50 and 52 which may be of tungsten wire and extend through respective chamber caps 48 toward the center of the central portion 46 of the chamber. The ends of the two electrodes define the ends of the analysis region 26. Electrodes 50 and 52 are connected through an external load resistance 54 to a direct current power source 56. This circuit comprises the activation means 28.

In a specific embodiment of the apparatus using a helium carrier gas, the central portion 46 of the analysis chamber 40 was formed of quartz capillary tubing having an inner diameter of 1 to 2 millimeters. The electrodes 50 and 52 were positioned with their ends about one-half inch apart although a range of one-fourth to three-fourths inch or even longer could also be used. The power consumed was between about 20 watts and 40 watts per inch of gas analysis space length which for the one-half inch length amounted to 10 watts. Operation at a level as low as 5 watts was achieved at some reduction in sensitivity. The power source 56 used with this embodiment was a small conventional adjustable power source providing about 1,000 volts potential and 20 milliamps current. Such a source is commercially available which weighs only 2 pounds and occupies only about 80 cubic inches. Although production of a plasma at atmospheric pressure requires greater power than is required at reduced pressure it may still be accomplished with such a source. It may, therefore, be seen that the apparatus may be made lightweight and compact by eliminating pressure-reducing equipment and operating at atmospheric pressure.

As previously mentioned, the components of the sample gas upon excitation produce radiation having characteristic frequencies and wavelengths. These are detected by the sensing means 30 which resolves the radiation produced into a spectrum by spectrum-producing means 58 and selectively detects the existence and intensity of the radiation at various frequencies by detection means 60. Intensity of a frequency, of course, is indicative of the amount of the associated gas component present. A variety of spectrum-producing devices are available and suitable for such use including prisms, grating monochromators, spectrographs, or interference filters. Generally, interference filters facilitate fabrication of a more compact assembly and are more suitable for routine, repetitive use. In research work, a plane grating combination spectrograph/spectrometer may be used with two gratings which permits good sensitivity to radiation over a wavelength range from about 1,800 A. to about 10,000 A.

Table I relates to spectroscopic emission techniques. It compares the limits of detection, i.e., the smallest amounts which may be detected in 15 to 20 second intervals, of specified products of ionization of named compounds by three other emission-type devices and by the present invention.

Table I

| Device | Compound Detected | Ionization Product | Limits of Detection-Grams |
| --- | --- | --- | --- |
| Continuous direct current discharge | 2-bromopropane | CN | $6.0 \times 10^{11}$ |
| Continuous direct current discharge | 2-bromopropane | $C_2$ | $5.3 \times 10^{11}$ |
| Microwave sustained plasma | n-hexane | CN | $1.1 \times 10^{16}$ |
| Microwave sustained plasma | n-hexane | $C_2$ | $3.6 \times 10^{16}$ |
| Tesla coil sustained plasma | n-hexane | CN | $2 \times 10^{17}$ |
| Tesla coil sustained plasma | n-hexane | $C_2$ | $1.1 \times 10^{17}$ |
| Flame emission | n-pentane | $C_2$ | $7.2 \times 10^{16}$ |
| Flame emission | n-pentane | CH | $3 \times 10^{16}$ |

Table II relates to devices used in gas chromatography. It compares the limits of detection, suitable sample sizes, the materials which may be detected and the selectivity of the present invention and three gas analysis devices used in gas chromatography.

TABLE II

| Device | Limits of detection-grams | Materials detected | Suitable sample sizes-milligrams | Selectivity |
| --- | --- | --- | --- | --- |
| Continuous direct current discharge | $1 \times 10^{-10} - 1 \times 10^{-12}$ | All materials, generally applicable. | 0.0001-0.1 | Wavelength dependent; all elements in compounds detected selectively. |
| Electron capture | $1 \times 10^{-10} - 1 \times 10^{-12}$ | Halogenated compounds, conjugated esters. | 0.001-1.0 | Most organic compounds not detected, poor selectivity between detected compounds. |
| Flame ionization | $1 \times 10^{-9}$ | All carbon-containing compounds. | 0.01-1.0 | Non-selective, sensitive to carbon number, inorganic compounds not detected. |
| Thermal conductivity | $1 \times 10^{-6}$ | All materials, generally applicable. | 1.0-10 | Completely non-selective, all materials respond. |

The detection means 60 may include a photomultiplier tube with a conventional power source 62. The photomultiplier tube may be mounted upon a scanning drive mechanism (not shown) which causes the tube to move across and scan the spectrum at a predetermined speed so that the tube produces an output at different times representative of the intensity of the different wavelengths of radiation produced, with the time of a particular output of the tube corresponding to a particular wavelength of the spectrum. The output of such a photomultiplier tube may be connected to an amplifier 32 in the form of a picoammeter and a recorder 34 of conventional design. It will be apparent, of course, that photographic plates could also be used to detect and record the output of the spectrum-producing means 58.

Another form of sample analysis section is illustrated in part in FIG. 4 in which similar parts are indicated by the same numerals as in other figures followed by the postscript A. In this embodiment the activating circuit 28A includes tubular electrodes 50A and 52A which may be made of platinum. One of the electrodes 50A is connected to the tubing 21 and the other to the gas outlet of the system so that gas flows directly into and out of the gas analysis region 26 through the electrodes 50A and 52A. The remainder of analysis chamber 46A is substantially the same in materials and dimensions as the chamber 46A illustrated in FIG. 3 except that the shape of chamber caps 48A may be suitable modified to eliminate the gas inlet 42 and outlet 44 there shown and to accept the tube electrodes instead of the wire electrodes.

Illustrations of the superiority of the above-described method and apparatus for gas analysis over both other devices using spectroscopic emission techniques and other devices commonly used in gas chromatography may be seen in the following tables.

It may be seen that the described method and apparatus provides a sensitive and selective means for gas analysis which is applicable to many gases and which in many instances requires much smaller samples of the subject gas. Furthermore, the apparatus is operable at atmospheric pressure and may easily be made compact and light in weight for portability. Various changes and modifications of the method and apparatus may be made without departing from the invention. For example, the form and materials of the analysis chamber and activating circuit could be modified and other sample modification and sensing devices could be used, all of which would fall within the spirit and scope of the invention.

Various features of the invention are set forth in the accompanying claims.

I claim:

1. A method of analyzing a subject gas comprising mixing said subject gas with a carrier gas having a higher ionization potential than any of the components of said subject gas to provide a gas mixture, introducing said gas mixture into an analysis space with an anode and a cathode at opposite ends thereof, maintaining said analysis space at substantially atmospheric pressure, applying a direct current voltage to said anode and said cathode of such magnitude as to produce a small continuous direct current discharge between said anode and said cathode and to produce in said analysis space and sustain therein a plasma formed from said carrier gas whereby components of said subject gas are excited to emit light by transfer of energy from said plasma, resolving said emitted light into a spectrum, and selectively detecting the existence and intensity of various frequencies of said light to indicate the amount of corresponding components of said subject gas in said gas analysis space.

2. A method of analyzing a subject gas in accordance with claim 1 wherein said step of mixing said subject gas comprises mixing said subject gas with a noble gas.

3. A method of analyzing a subject gas in accordance with claim 1 wherein said step of mixing said subject gas comprises mixing said subject gas with helium.

4. A method of analyzing a subject gas in accordance with claim 1 including causing said gas mixture to flow into said analysis space at one end thereof and out of said analysis space at the other end thereof.

5. A method of analyzing a subject gas in accordance with claim 4 including introducing said gas mixture into said analysis space at a rate of less than about 300 milliliters per minute.

6. A method of analyzing a subject gas in accordance with claim 1 including applying a direct current voltage of the order of 1,000 volts to produce a continuous direct current discharge of the order of about 20 milliamps.

7. Apparatus for analyzing a subject gas comprising means for mixing said subject gas with a carrier gas having a higher ionization potential than any of the components of said subject gas to provide a gas mixture, a gas analysis chamber at substantially atmospheric pressure for receiving said gas mixture, two electrodes positioned within said chamber adjacent opposite ends thereof and defining an elongated analysis space within said chamber, power means for applying a direct current voltage to said electrodes of such magnitude as to produce a small continuous direct current discharge between said electrodes and to produce in said analysis space and sustain the existence therein of a plasma formed from said carrier gas whereby components of said subject gas are excited to emit light by transfer of energy from said plasma, means for resolving said emitted light into a spectrum, and means for selectively detecting the existence and intensity of various frequencies of said light to indicate the amount of corresponding components of said subject gas in said gas analysis space.

8. Apparatus in accordance with claim 7 wherein said gas analysis chamber includes a gas inlet for said gas mixture adjacent one of said electrodes and a gas outlet for said gas mixture adjacent the other of said electrodes so that said gas mixture flows through said chamber longitudinally of said analysis space.

9. Apparatus in accordance with claim 7 wherein each of said electrodes comprise a solid thin wire.

10. Apparatus in accordance with claim 7 wherein each of said electrodes comprises a hollow conductive tube in contact with said gas along its length through one of which tubes said gas enters said chamber and through the other of which tubes said gas leaves said chamber.

11. Apparatus in accordance with claim 7 wherein said gas analysis space has a length of between about one-fourth inch and about three-fourths inch and a diameter of between about 1 mm. and 10 mm.

12. Apparatus in accordance with claim 11 wherein said power means supplies a power of about 10 to 40 watts per inch of analysis space length.

13. Apparatus in accordance with claim 7 wherein said chamber is formed of heat resistant translucent glass.

14. Apparatus in a accordance with claim 7 wherein said chamber is formed of translucent quartz.

15. Apparatus for use in analyzing a subject gas mixed with a carrier gas having a higher ionization potential than any of the components of said subject gas comprising a gas analysis chamber at substantially atmospheric pressure for receiving said gas mixture, two electrodes positioned within said chamber adjacent opposite ends thereof and defining an elongated analysis space within said chamber, power means for applying a direct current voltage to said electrodes of such magnitude as to produce a small continuous direct current discharge between said electrodes and to produce in said analysis space and sustain the existence therein of a plasma formed from said carrier gas whereby components of said subject gas are excited to emit light by transfer of energy from said plasma, means for resolving said emitted light into a spectrum, and means for selectively detecting the existence and intensity of various frequencies of said light to indicate the amount of corresponding components of said subject gas in said gas analysis space.

UNITED STATES PATENT OFFICE
CERTIFICATE OF CORRECTION

Patent No. 3,612,686                    Dated October 12, 1971

Inventor(s) Robert S. Braman and Alexander Dynako

It is certified that error appears in the above-identified patent and that said Letters Patent are hereby corrected as shown below:

Column 1, line 9, after "industrial processes," insert --the detection of leaks in closed vessels or systems--;
Column 2, line 21, change "components" to --important--;
Column 4, line 66, change "activation" to --activating--;
Column 5, line 69, change "suitable" to --suitably--;
Column 6, lines 10-25, correct numbers under "Table I" under "Limits of Detection-Grams":

change "10112" to --$10^{-12}$--.

change "10111" to --$10^{-11}$--.

change "10110" to --$10^{-10}$--.

change "10110" to --$10^{-10}$--.

change "1017" to --$10^{-7}$--.

change "1017" to --$10^{-7}$--.

change "1016" to --$10^{-6}$--.

change "1015" to --$10^{-5}$--.

Signed and sealed this 3rd day of October 1972.

(SEAL)
Attest:

EDWARD M. FLETCHER, JR.          ROBERT GOTTSCHALK
Attesting Officer                Commissioner of Patents